United States Patent [19]

Sparling et al.

[11] Patent Number: 4,972,071

[45] Date of Patent: Nov. 20, 1990

[54] METHOD AND APPARATUS FOR COUNTING OVERLAPPING OBECTS

[75] Inventors: David L. Sparling, Essex; Andrew D. Gardner, Colchester, both of England

[73] Assignee: Quantity & Time Management Systems Limited, Colchester, England

[21] Appl. No.: 343,846

[22] Filed: Apr. 26, 1989

[30] Foreign Application Priority Data

Apr. 29, 1988 [GB] United Kingdom ................. 8810290

[51] Int. Cl.[5] ................................................ G01V 9/04

[52] U.S. Cl. ............................. 250/222.2; 250/223 R; 377/53

[58] Field of Search .................. 250/221, 222.1, 222.2, 250/223 R; 377/8, 53

[56] References Cited

U.S. PATENT DOCUMENTS

| | | | |
|---|---|---|---|
| 3,414,732 | 12/1968 | Stegenga | 250/223 R |
| 3,737,666 | 6/1973 | Dutro | 250/223 R |
| 4,027,155 | 5/1977 | Rappaport | 250/223 R |
| 4,217,491 | 8/1980 | Dufford, Jr. et al. | 250/223 R |
| 4,286,149 | 8/1981 | Ben-Nathan et al. | 250/223 R |
| 4,365,151 | 12/1982 | Fasig et al. | 250/223 R |
| 4,450,352 | 5/1984 | Olsson | 250/223 R |
| 4,778,986 | 10/1988 | Lundberg et al. | 250/223 R |

*Primary Examiner*—David C. Nelms
*Assistant Examiner*—Stephone B. Allen
*Attorney, Agent, or Firm*—Weingram & Zall

[57] ABSTRACT

Apparatus and a method for counting primarily printed copy being advanced along a path in an overlapping manner is arranged to direct two beams of infra-red radiation on to a predetermined region in the path of advancement of the copy. The two beams are distinguishable and are directed from positions respectively upstream and downstream of said region. Two detectors are disposed above said region, to receive radiation from two distincts areas respectively, both within said region, but spaced in the direction of the path of advancement of the copy. Suitable processing of the detector outputs, to determine the gradients of the said areas, allows the generation of a count signal as the leading edge of an object passes through said region.

11 Claims, 5 Drawing Sheets

METHOD AND APPARATUS FOR COUNTING OVERLAPPING OBECTS

BACKGROUND OF THE INVENTION (a) Field of the Invention

This invention relates both to apparatus for and methods of counting objects passing a given point, over a period of time. In particular—but not exclusively this invention concerns the counting of relatively thin objects which are advanced through the counting point in an overlapping manner, such as in the case of the counting of printed copy issuing from a printing press.

(b) Description of the Prior Art

Using modern technology, the counting of many kinds of objects passing a given point presents no particular problems, if those objects are spaced apart. For example, the counting can be performed mechanically, optically or magnetically, depending upon the nature of the objects. Even in the case of essentially flat, sheet-like objects which are advanced in an overlapping state, relatively simple counters can produce exact results, provided that the thickness of the objects and their degree of overlap are essentially constant. Unfortunately, for a case where the thickness of the objects is variable or where the extent of the overlap varies, the problem of accurately counting the objects is much increased. Depending upon the method employed, the accuracy may be worsened by the object having variable surface finishes, faults and—for optical counters—colour variations.

A particular problem arises in the case of printed copy leaving a printing press. Such printed copy may be of variable thickness, may have different extents of overlap and may have light and dark printed areas as well as torn or damaged portions. If the printed copy is folded—as in the case for example of newspapers the problems are greatly exacerbated and much effort has been expended on finding satisfactory counters for such printed copy. Whilst mechanical or electro-mechanical counters can sometimes be used to sense the leading folded edge on each printed copy, relatively thin copy cannot be sensed reliably in this way and moreover miscounts can easily occur due to creases, bulges or the like. Experience also shows that closely spaced copies moving at relatively high speeds cannot reliably be counted, even if the mechanical sensors are set and adjusted with great care.

In an attempt to overcome the above problem, there have been proposals for optical photo-electric counters, directing a beam of light obliquely on to the printed copy in the direction advancement of that copy. However, reliable results still are not obtained, either because photo-electric counters can erroneously react to areas of dark print or because the copy is too thin for a reliable output to be obtained.

Improvements in optical counters have been described for example in U.S. Patent Specification No. 4,286,149 (NCR Canada Limited) and in International Specification No. WO 85/05206 (Quantity & Time Management Systems Limited). In both of these Specifications there are described counters employing a pair of beams directed obliquely on to the objects being advanced, from positions upstream and downstream of the counting point. At least one receiver is arranged to detect radiation reflected from the counting point and a determination is made of whether radiation from both sources is being received, or radiation from only one source, on account of a shadow effect at the leading edge of an advancing object. From the output of the detector, a decision is taken on whether the object count should be incremented. In an attempt to improve reliability, the U.S. Specification also describes an arrangement in which two detectors are used, spaced apart by a significant distance along the path of advancement.

Tests have shown that counters as described above still do not give entirely accurate results, especially when used in conjunction with newspapers and similar print copy. Such counters may still be confused by changes in the reflectivity of the copy in the region of the leading edge, caused for example by variations in the density of the printing, and also by variations in the thickness of the copy being counted. Also, erroneous operation frequently occurs when the upper surface of the printed copy is rippled or wavy, such as may happen when inserts, leaflets or the like are placed within the folded printed copy.

OBJECTS OF THE INVENTION

In view of the foregoing, it is a principal object of the present invention to improve further upon the reliability of the above-described counters while still using similar detection techniques.

A further object of the present invention is to provide apparatus for counting objects, such as folded printed copy, advanced along a path in an overlapping manner, which apparatus may provide an accurate count notwithstanding variations in those objects.

Yet another object of this invention is to provide apparatus for counting such objects, which apparatus does not rely on any contact with those objects, and requires a minimum of setting-up in order to permit its use.

A further object of the present invention is to provide a method of counting objects, such as folded printed copy, along a path in an overlapping manner, which method is relatively easy to implement and yet provides a reliable and accurate count of the advanced objects.

SUMMARY OF THE INVENTION

In accordance with the foregoing and other objects, one aspect of this invention provides apparatus for counting objects advanced along a path in an overlapping manner, which apparatus comprises:

a first radiation source; a second radiation source; said first and second radiation sources each being adapted to direct radiation obliquely towards a predefined region in said path of advancement of the objects to be counted; said first source being disposed upstream and said second source being disposed downstream of said region and the radiations from the two sources being similar but distinguishable; a first radiation detector; a second radiation detector; said first and second radiation detectors being disposed closely adjacent one another but spaced apart in the direction of the length of said path to receive radiation reflected respectively from two distinct areas both within said region but spaced in said direction of the length of said path; and analyser means arranged to act on the outputs of said two radiation detectors and to provide an object count signal dependent upon the rate of change with respect to unit path length of the reflected radiations, as detected by the two detectors.

In accordance with a further aspect of this invention, there is provided a method of counting objects advanced along a path in an overlapping manner, in which method first and second beams of radiation are directed on to a region disposed in said path of advancement of the objects, said first and second beams being distinguishable from one another and being directed to said region obliquely from positions respectively upstream and downstream thereof, radiation reflected from two areas within said region but separated along the length of said path is received by two detectors relatively closely spaced along the length of said path, and the outputs of said two detectors are analysed to determine the rate with respect to unit path length at which the detected reflected radiations change, a count signal being issued dependent thereon.

It will be appreciated that with both the apparatus and the method of the present invention, an attempt has been made to overcome the problem of erroneous counting caused for example by a ripple in the upper surface an object being counted or by variations in the reflectivity of the surface of the object passing through the count region. This is achieved by providing two radiation detectors focused on two spaced apart areas within said region, and an analyser means acting on the outputs of the two detectors in such a manner as to determine the rate of change of the reflected radiation with respect to unit path length, to produce a count signal dependent thereon.

BRIEF DESCRIPTION OF THE DRAWINGS

The accompanying drawings show one specific embodiment of apparatus of this invention, operating in accordance with the method thereof, which embodiment will be described in greater detail hereinafter. In the drawings.

DESCRIPTION OF THE PREFERRED EMBODIMENTS

Figure 1:
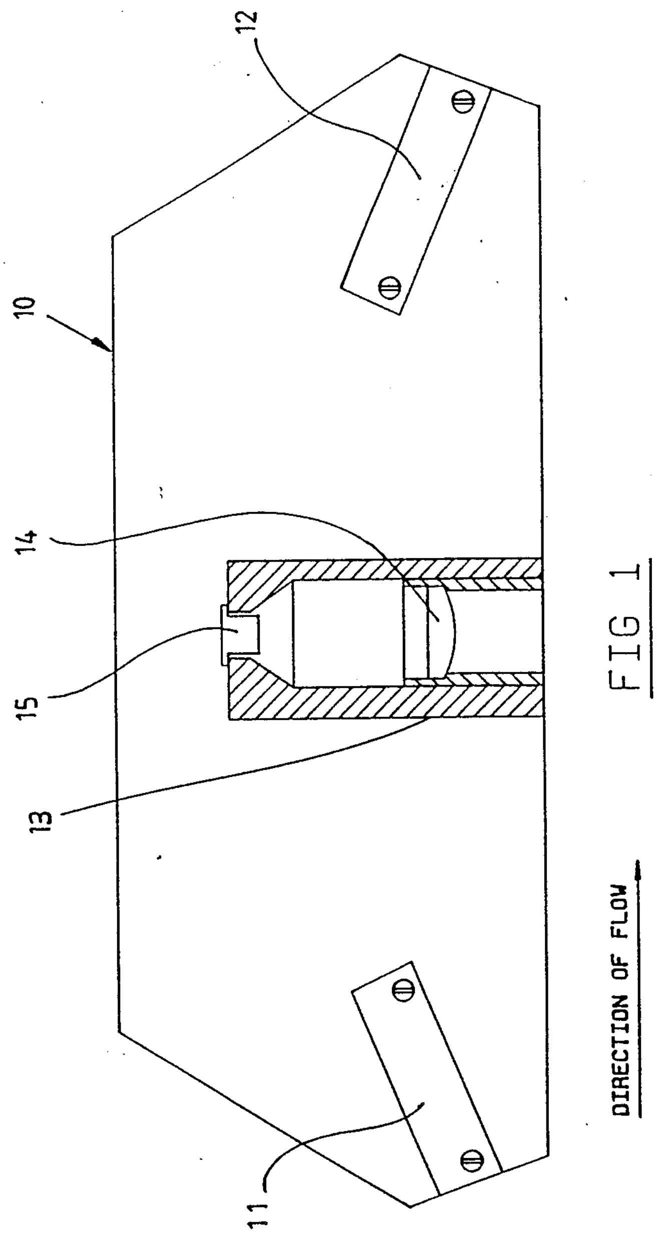
FIG. 1 is a diagrammatic vertical cross-section through a counter head of the apparatus of this invention.

Though the invention may be used to count various objects which are advanced in an overlapping manner along a path, the invention finds particular application to the counting of printed copy. Accordingly, in the following further description of this invention and of the preferred embodiments, reference will be made solely to the counting of such copy, though it is to be understood that many of the preferred features to be described below are equally applicable to the counting of objects other than printed copy.

In a preferred aspect of this invention, the outputs of the two detectors are analysed so as to be indicative of the effective slope or gradient at the two areas from which the two detectors receive reflected radiation, with respect to the direction of the path of advancement of the objects. If the determined gradients are zero (i.e. horizontal), then no count signal is generated. If however at least one determined gradient is negative, then a decision is taken on whether to issue a count signal dependent upon the value of that negative gradient, and upon the rate of change of the detected radiation reflected from said region, with respect to unit path length.

The areas from which each detector receives reflected radiation must be relatively small, in order that the gradient detection at the leading edge of a copy is not swamped by received reflected radiation from the copy surfaces to each side of the leading edge. Typically, the area from which each detector receives reflected radiation may have a size of from 0.5 mm to 5.0 mm diameter, with a value of 2 mm giving particularly good results. The areas from which the two detectors respectively receive radiation must be distinct, and may be contiguous or spaced apart along the length of the path by typically 1 to 2 mm.

In order that the apparatus and method of this invention may adequately function, the radiation from one source must be distinguishable from the radiation of the other source. This permits the analyser means to reject zero or two positive gradients at the areas from which the two detectors respectively receive radiation. The two radiations are preferably electro-magnetic (though for some types of object could be sonar) and could be distinguishable in frequency or in polarisation, though most preferably are distinguishable in time. To this end, it is preferred for the radiation sources to be alternately keyed on and off in antiphase, whereby the outputs of the two detectors may at any instant be associated with radiation from one source or the other, as appropriate. Conveniently, infra-red radiation is employed.

Most preferably, two separate signals are obtained from the two detectors, by suitable processing of the respective detector outputs, which signals are then subtracted one from the other and a decision taken on whether a count signal should be generated dependent upon the magnitude of the resultant signal difference. By taking the phases of the detector outputs into account, gradient detection is simplified: rejection of two positive and zero gradients allows a simple threshold detection to be employed, only when at least one negative gradient has been determined as being present. This presumes that the copy is being advanced along the path in an overlapping manner, with the leading edge of the next following copy lying on top of the trailing edge of a leading copy. If the copy is advanced differently (e.g. spaced, or with the trailing edge of one copy overlying the leading edge of the next following copy) then the detection method may be amended, as appropriate.

The preferred specific embodiment of this invention will now be described in detail, reference being made as appropriate to the accompanying drawings. Referring initially to FIG. 1, there is shown the head of the specific embodiment, intended for mounting above the path of advancement of overlapped folded paper on a conveyer stream, such as frequently occurs in the printing industry. Such copy may comprise, for example, folded newspapers, with leaflets inserted into each newspaper.

The head 10 has a casing in which are mounted two sets 11 and 12 of infra-red emitting diodes, the two sets being spaced apart along the length of the path of advancement of the copy, with set 11 being disposed upstream. The sets are angled as shown to direct radiation on to the same area on the copy path (not shown in FIG. 1). Between the two sets 11 and 12 is provided a barrel 13 in which is mounted a plano-convex lens 14 together with a filter to exclude radiation other than infra-red, the lens being arranged to collect infra-red radiation reflected from the area of the path on to which the sets 11 and 12 of infra-red emitters direct radiation. The radiation collected by the lens 14 is directed on to a pair of photo-diodes arranged in a single housing 15, the diodes being spaced apart by a relatively small distance (typically 2 mm) in the direction of advancement of the copy. In this way, the photo-diodes receive radiation reflected from two distinct areas spaced apart by about 2 mm along the direction of advancement of the copy.

Figure 2A:
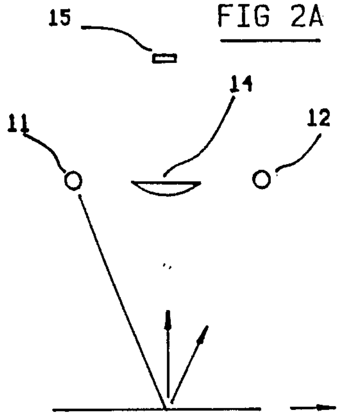
FIGS. 2A to 2F show the reflection states for various attitudes of copy being counted.
Figure 2B:
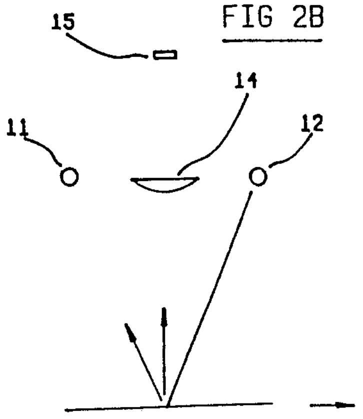
Figure 2C:
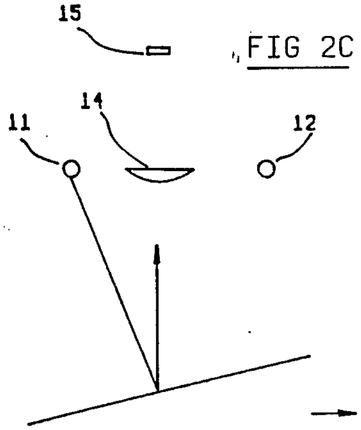
Figure 2D:
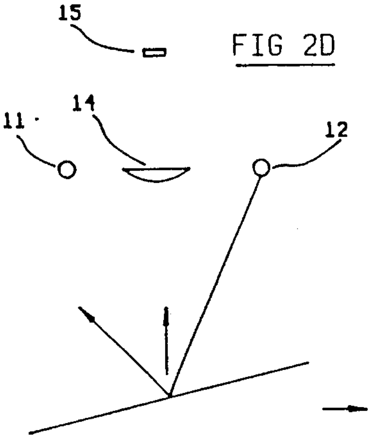
Figure 2E:
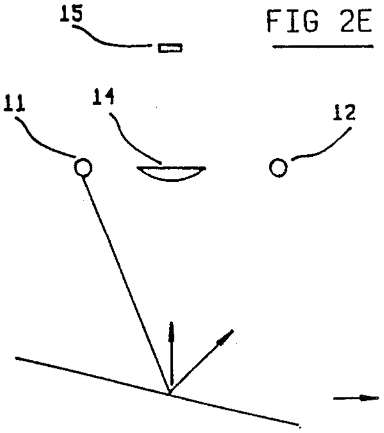
Figure 2F:
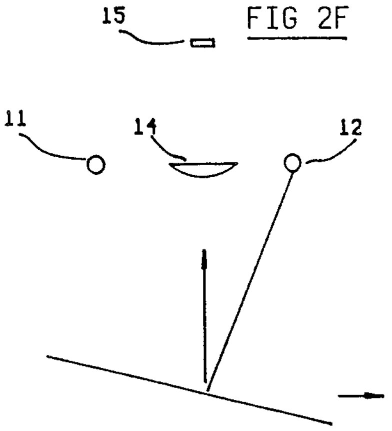
Figures 3A, 3B, 3C, 3D, 3E, 3F:
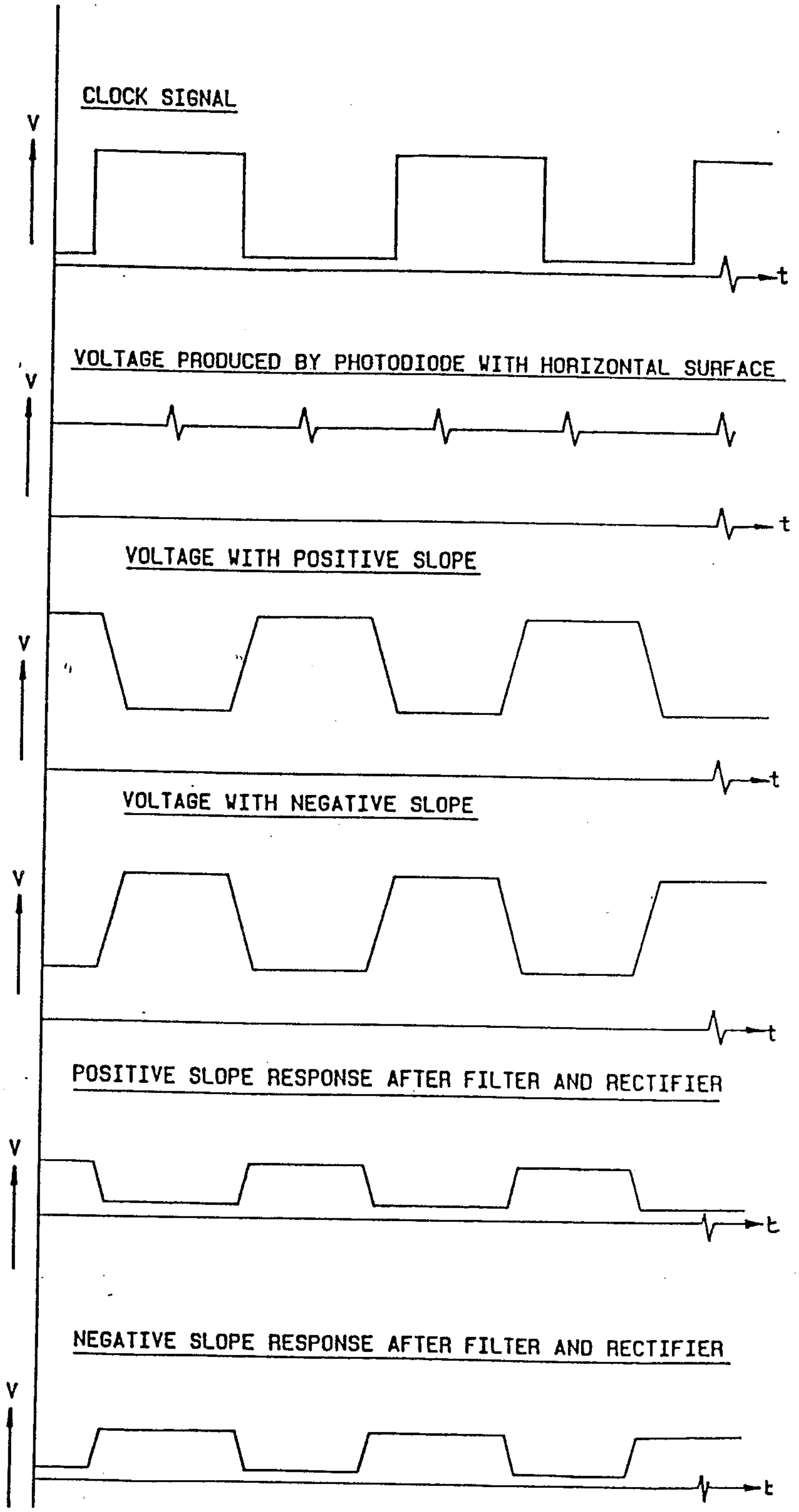
FIGS. 3A to 3F show various waveforms present in the counter circuitry.
Figure 4:
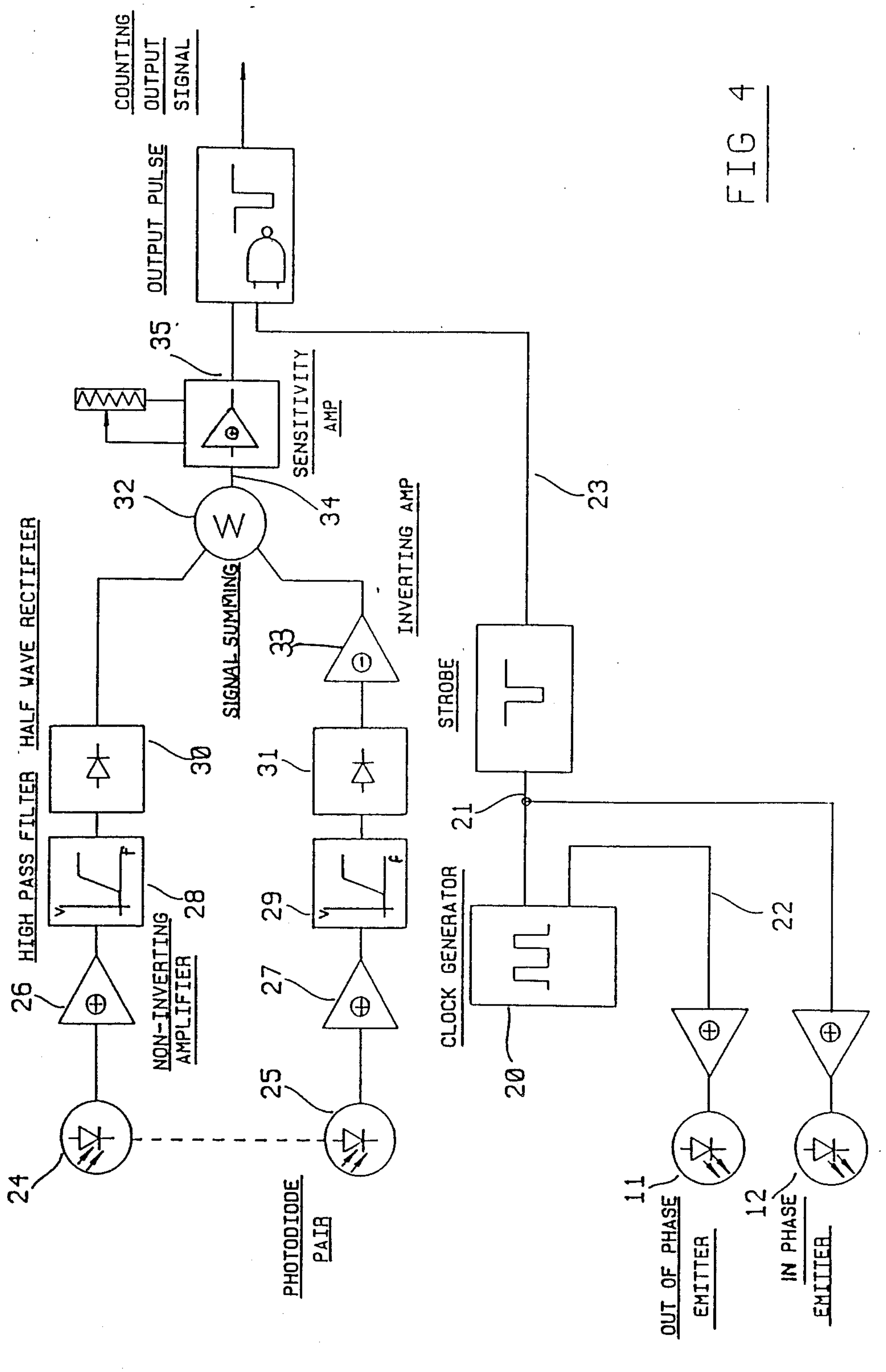
FIG. 4 is a block diagram of the analyser circuit for use in conjunction with the counter head shown in FIG. 1.

The infra-red emitters of the two sets 11 and 12 are arranged to be keyed on and off alternately in antiphase, by a clock signal (FIG. 3A) produced by an analyser circuit (FIG. 4). If a horizontal surface lies beneath the head 10 as shown in FIGS. 2A and 2B, then the radiation collected by the lens 14 will be constant, irrespective of which set of infra-red emitters is keyed on. The outputs of the photo-diodes in housing 15 will thus be essentially constant, as shown in FIG. 3B. If a surface with a positive slope lies beneath the head (FIGS. 2C and 2D) then the radiation collected by lens 14 will have a much greater intensity when the leading set 11 of emitters is keyed on than when the lagging set 12 of emitters is keyed on; the output waveform from the photo-diodes will thus be as shown in FIG. 3C. Conversely, should the surface beneath the head 10 have a negative slope, (as shown in FIGS. 2E and 2F), then the radiation collected by lens 14 when the lagging set 12 of emitters is keyed on will be greater than when the leading set 11 is turned on (FIG. 3D).

The waveforms of FIGS. 3B to 3D are processed by removing the DC content, using high pass filters, and the resultant signal is then half-wave rectified to remove the negative voltage part of the signal. The wave-form of FIG. 3E will result in the case of the initial waveform of FIGS. 3C, and the waveform of FIG. 3F in the case of the initial waveform of FIG. 3D. No signal will result in the case of the waveform of FIG. 3B. It will therefore be appreciated that the horizontal surface will produce no signal output; a surface with a positive gradient will produce a signal similar to but out of phase with the clock signal and a surface with a negative gradient will produce a signal similar to and in-phase with the clock signal.

Referring now to FIG. 4, there is shown in block form an analyser circuit for use with the counter head of FIG. 1. A clock generator 20 produces in- and out-of-phase signals on lines 21 and 22 respectively, which signals are amplified to drive the sets 11 and 12 of infra-red emitters, respectively. The in-phase signal also is used to provide a strobe signal 23, for a purpose to be described below.

The two photo-diodes contained within the single housing 15 are shown at 24 and 25. The outputs of these are passed through non-inverting amplifiers 26 and 27 respectively, then through high pass filters 28 and 29 respectively and half-wave rectifiers 30 and 31 respectively. The output of half-wave rectifier 30 is supplied directly to a summing circuit 32, but the output from half-wave rectifier 31 is inverted by amplifier 33 before being supplied to the summing circuit 32; in this way, the output of the summing circuit 32 appearing on line 34 is the difference between the outputs of the two half-wave rectifiers 30 and 31.

The output of the summing circuit 32 is passed through an adjustable sensitivity amplifier 35 and then fed to a comparator which is strobed by signal 23, in-phase with the clock signal 21, to determine in conjunction with the processed outputs of the two photodiodes whether a count signal should be generated. In effect, this is decided on the basis of the amplitude and phase of the output of the sensitivity amplifier 35.

The amplitude of each photo-diode signal, following the high pass filter and half-wave rectification, is indicative of the gradient of the surface at the area at which radiation is reflected to that photo-diode, though the relationship is complex and non-linear. Ripples in the surface of the copy passing beneath the head 10 may produce at either photo-diode an in-phase signal indistinguishable from a copy edge transition, particularly where the copy is relatively thin or distorted. In an attempt to overcome this and so to distinguish the leading edge of a copy and noise effects for example from rippled surfaces, the circuit of FIG. 4 operates to take into account the rate of change of the surface gradient, having regard to unit length along the path of copy advancement, rather than time, by analysing the gradients at the two spaced-apart areas from which the two photo-diodes respectively receive radiation.

As mentioned above, a copy count signal may be generated only when a rate of change of negative gradient exceeding a pre-set threshold value has been determined to be present, as indicated by the presence of a detected signal in-phase with the clock signal, of a level greater than said pre-set threshold value. In the following Table, the various possibilities are set out, having regard to the signals obtained from the photo-diodes. In the Table, signal A represents that derived from photo-diode 24, and signal B that derived from photo-diode 25.

TABLE

| FIG. No. | Signal A from Photo-diode 24 | Signal B from Photo-diode 25 | Comparison | Count? |
|---|---|---|---|---|
| 5A | 0 | 0 | 0 | No |
| 5B | 0 | Out of Phase | Out of Phase | No |
| 5C | 0 | In Phase | In Phase | Yes |
| 5D | Out of Phase | 0 | 0 | No |
| 5E | Out of Phase | Out of Phase | 0 | No |
| 5F | Out of Phase | In Phase | In Phase | Yes |
| 5G | In Phase | 0 | 0 | No |
| 5H | In Phase | Out of Phase | 0 | No |
| 5I | In Phase | In Phase | B > A | Yes |
| | | | B < A | No |
| | | | B = A | No |

Figure 5A:
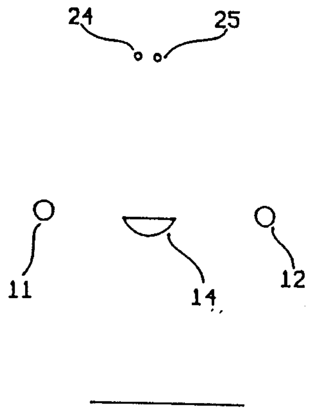
FIGS. 5A to 5I show various reflection states when the counter is in use.
Figure 5B:
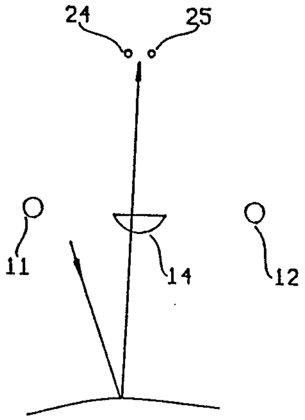
Figure 5C:
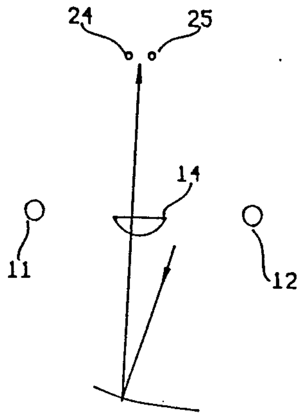
Figure 5D:
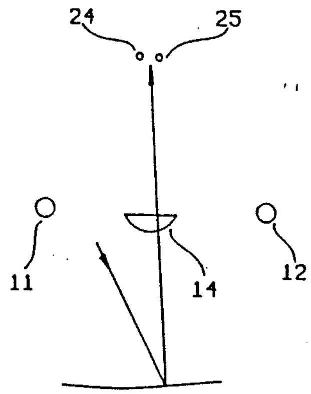
Figure 5E:
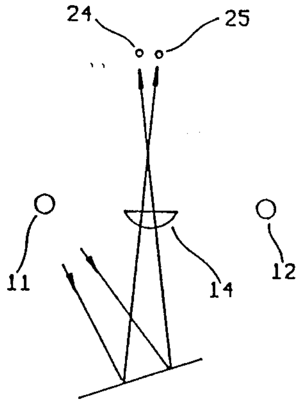
Figure 5F:
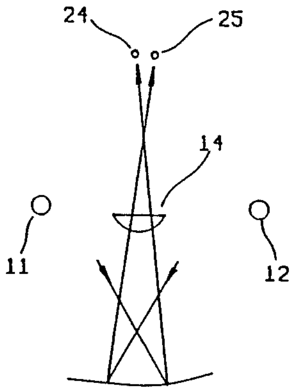
Figure 5G:
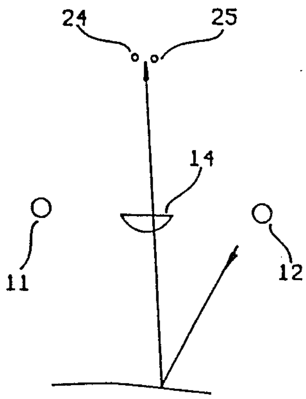
Figure 5H:
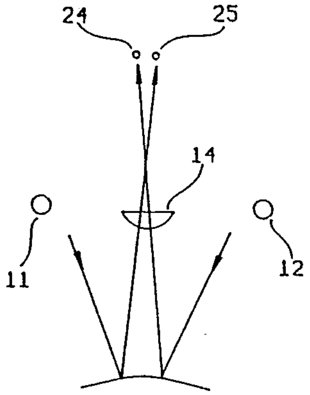
Figure 5I:
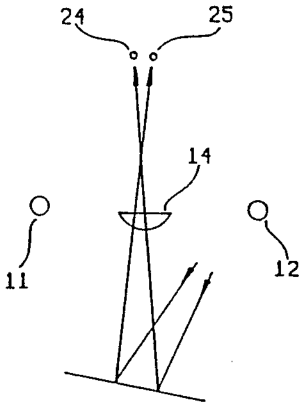

From the above Table and FIGS. 5A to 5I, it will be appreciated that only two basic surface conditions are of interest, as shown in FIGS. 5C and 5I. The abnormal situation in FIG. 5F also may give rise to a count signal being generated but in practical applications it would not be expected that this copy configuration could be achieved, with a level above the threshold value for in-phase signals.

By setting appropriate threshold levels, it will be seen that a copy-count signal will be obtained only when the rate of change of the surface gradient per unit distance along the path of advancement has been exceeded, and this will occur only when the leading edge of a copy is present. High reliability may thus be expected, with excellent rejection of spurious counts due to ripples and other surface distortions, particularly in the case of counting folded printed matter advanced in an overlapping manner.

Suitable modification of the detection analysis will allow the apparatus to operate with copy or other objects advanced in different configurations, such as spaced, or with the trailing edge of one copy overlying the leading edge of the next following copy. However, the principal of the analysis will remain the same—that is to say, the determination of the rate of change of the gradient, with respect to the unit path length.

I CLAIM:

1. Apparatus for counting objects advanced along a path in an overlapping manner, which apparatus comprises:

a first radiation source;

a second radiation source;

said first and second radiation sources each being adapted to direct radiation obliquely towards a single predefined region in said path of advancement of the objects to be counted;

said first source being disposed upstream and said second source being disposed downstream of said region and the radiations from the two sources being similar but distinguishable;

a first radiation detector;

a second radiation detector;

said first and second radiation detectors being disposed closely adjacent one another but spaced apart in the direction of the length of said path, to receive radiation reflected respectively from two distinct areas both within said pre-defined region but spaced in said direction of the length of said path; and analyser means arranged to act on the outputs of said two radiation detectors and to provide an object count signal dependent upon the rate of change with respect to unit path length of the reflected radiations as detected by the two detectors.

2. Apparatus according to claim 1, in which each of said radiation sources comprises and infra-red transmitter, and each of said radiation detectors comprises an infra-red detecting element.

3. Apparatus according to claim 1, in which control means are provided to control the operation of the first and second radiation sources, whereby said sources are operated in anti-phase.

4. A method of counting objects advanced along a path in an overlapping manner, in which method first and second beams of radiation are directed on to a region disposed in said path of advancement of the objects, said first and second beams being distinguishable from one another and being directed to said region obliquely from positions respectively upstream and downstream thereof, radiation reflected from two areas within said region but separated along the length of said path is received by two detectors relatively closely spaced along the length of said path, and the outputs of said two detectors are analysed to determine the rate with respect to unit path length at which the detected reflected radiations change, a count signal being issued dependent thereon.

5. A method of counting objects according to claim 4, in which the outputs of said two detectors are analysed so as to be indicative of the effective slope or gradient of said two areas from which the two detectors receive reflected radiation, which slope or gradient is determined with respect to the direction of the path of advancement of the objects.

6. A method of counting objects according to claim 4, in which each said area from which each detector respectively receives reflected radiation has a size of from 0.5 mm to 5.0 mm diameter.

7. A method of counting objects according to claim 6, in which said areas are distinct, and are spaced apart along the length of the path by from 0 to 2 mm.

8. A method of counting objects according to claim 4, in which the beams of radiation are one of electromagnetic radiation and sonar radiation, and are distinguishable in one of frequency, polarisation and time.

9. A method according to claim 8, in which the radiation beams are alternatively keyed on and off in anti-phase, whereby the outputs of the two detectors may at any instant be associated with radiation from one source or the other, as appropriate.

10. A method of counting objects according to claim 4, in which two separate signals are obtained from said two detectors, and said two separate signals are processed to yield respective detector outputs which are subtracted one from the other, a decision then being taken on whether a count signal should be generated dependent upon the magnitude of the resultant signal difference.

11. A method according to claim 10, in which the processing of said two separate signals determines the gradients of said areas on the basis of the phases of the said signals, and only when at least one negative gradient is determined as being present in then the magnitude of said resultant signal difference utilised to determine whether a count signal should be issued.

* * * * *